United States Patent

Reynolds et al.

[11] 4,366,178
[45] Dec. 28, 1982

[54] FREEZING BAKED BREAD GOODS

[75] Inventors: Martin M. Reynolds, Aurora; Linda Young-Bandala, La Grange, both of Ill.

[73] Assignee: Liquid Carbonic Corporation, Chicago, Ill.

[21] Appl. No.: 257,898

[22] Filed: Apr. 27, 1981

[51] Int. Cl.³ .............................................. A21D 15/02
[52] U.S. Cl. ......................................... 426/393; 62/65; 99/355; 99/470; 426/19; 426/27; 426/551; 426/497; 426/523; 426/524
[58] Field of Search ................. 426/551, 524, 393, 19, 426/27, 128, 497, 327, 444, 523; 99/355, 470; 62/65

[56] References Cited

U.S. PATENT DOCUMENTS

| | | | |
|---|---|---|---|
| 4,115,596 | 9/1978 | Knutrud | 426/524 |
| 4,138,854 | 2/1979 | Schlemmer | 426/524 |
| 4,303,687 | 12/1981 | Ratjen | 426/524 |

OTHER PUBLICATIONS

Bakery Technology & Engineering, 1960, Avi Publ. Co., S. Matz, Chapter 20.
Industrial & Engineering Chemistry, 3/39, Cathcart et al., vol. 31, No. 3, P, 362 plus.
Food Engineering, 12/66, Travberman, p. 86 plus.
Bread Science and Technology, "Sensory Attributes and Bread Staling", Yeshajahu Pomeranz, Ph.D. et al., (1971) pp. 170–186.
Bakery, "New Assaults on Bread Staling Problem", Simon S. Jackel, Ph.D. (1979) pp. 114, 116, 118, 120 and 190.
The Bakers Digest, "The Role of Wheat Flour Constituents in Bread Staling", Kim et al., (1977) pp. 38–44.

*Primary Examiner*—Steven L. Weinstein
*Attorney, Agent, or Firm*—Fitch, Even, Tabin, Flannery & Welsh

[57] ABSTRACT

After baking bread dough goods in an oven at about 375° F., their temperature is lowered to at least about 120° F., and they are then cryogenically cooled to about 45° F. or below in about 5 to about 15 minutes. The baked goods are then maintained at a temperature of about 37° F. to about 45° F. for at least about 25 minutes to effect substantial starch crystallization; after which time, slicing, bagging and freezing are carried out. Cryogenic cooling is preferably effected in a $CO_2$ cooler, and the cooled baked goods are maintained at about 40° F. for between about 25 and about 60 minutes prior to freezing by movement along an insulated conveyor which is cooled by circulation therethrough of cold $CO_2$ vapor exhaust from the $CO_2$ cooler.

9 Claims, 1 Drawing Figure

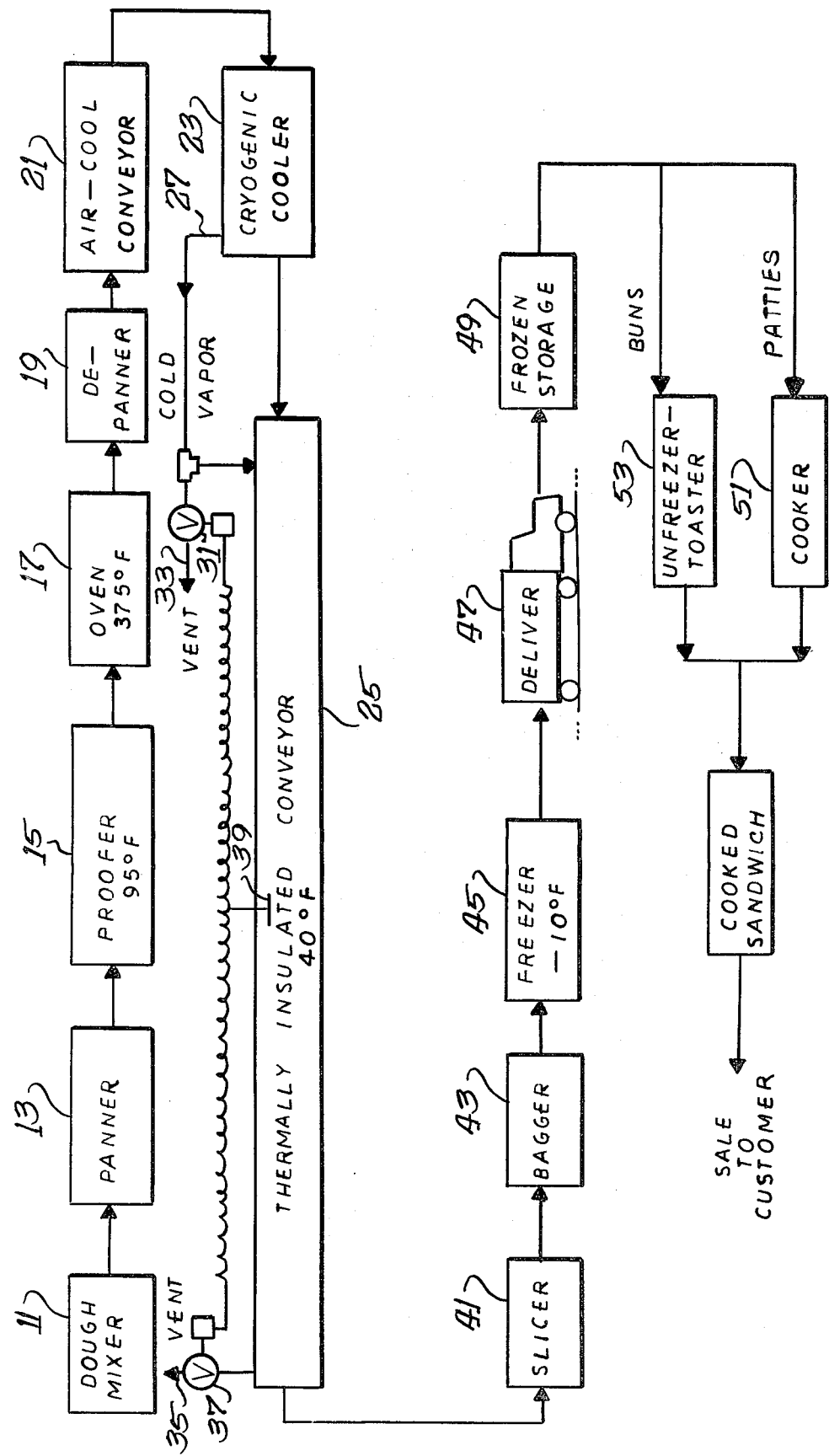

FREEZING BAKED BREAD GOODS

This invention relates to the preservation of freshly baked bread goods and more particularly to the treatment and preservation of freshly baked buns or the like.

BACKGROUND OF THE INVENTION

The mass production of bakery goods followed by the fast-freezing of the baked goods has been known and practiced for a number of years; however, most of the bakery goods so distributed was of the general type of coffee cakes, sweet rolls, dessert pastries and the like.

The introduction of the benefits of frozen distribution to baked bread goods, i.e., bread, rolls and the like, being produced in high volumes has been most difficult. One early attempt was to freeze the dough prior to proofing and then, at the point of use, proof and bake as needed. This has proven difficult to accomplish due to the fact that yeast action is required for proper proofing, and freezing tends to freeze-injure the yeast. In addition, an unpredictable amount of yeast death results from the vagaries of temperature encountered in the typical frozen food distribution chain. As a result when the frozen dough would be proofed, it might either rise excessively or insufficiently, depending on both the amount of yeast provided and its survival rate.

The problem with freezing freshly baked goods is that the starch crystallization necessary to fully convert dough to marketable bread goods will not occur while the goods are in the frozen state. Normally this starch crystallization fully occurs during the first 24 hours from the time the bread leaves the oven, and thus it occurs before normal consumption because distribution usually takes that long. If a large, high volume bakery were to store its baked goods for 24 hours before freezing so as to allow starch crystallization, the volume of baked products would require excessive conveyors and storage spaces and/or expensive rehandling. Accordingly, most high volume bakeries, such as those that make hamburger buns, proof and bake and then ship the buns fresh, allowing the starch crystallization to take place during the initial portion of the transportation period. However, fresh-baked goods tend to subsequently stale, and thus special consideration must be given to rapid delivery (necessitating special truck fleets), careful rotation of stock and the discarding to garbage of any old product. With the advent of fast food franchises, the market for buns and the like for hamburgers, red hots, fish fillets and other such items has magnified greatly. Because of the still increasing number of such fast-food outlets, improvements in the provision of such baked bread products have been actively sought.

BRIEF SUMMARY OF THE INVENTION

It has been found that freshly baked bread goods can be treated so as to promote and cause such rapid starch crystallization that they can then be frozen in a condition wherein, upon thawing, they are ready for immediate consumption. This is accomplished in a suitable manner for utilization by a continuously operating, high volume bakery. Shortly after their removal from the baking oven, buns or the like are quickly dropped to a temperature of about 40° F. by cryogenic cooling and thereafter held at this temperature for at least about one-half hour. Thereafter, they can immediately be sliced, bagged and then frozen in a form which will allow their preservation over a reasonable period of time, for example, three to four weeks. Most importantly, upon unfreezing or thawing, they exhibit the desired qualities of one-day old baked goods. The overall process is efficient and economic and offers substantial advantages in allowing the distribution of buns side-by-side with the distribution of frozen meat products, such as patties or the like.

BRIEF DESCRIPTION OF THE DRAWING

The FIGURE represents a flow-sheet which exemplifies a preferred method of treating hamburger buns which embodies various features of the invention.

DETAILED DESCRIPTION OF THE PREFERRED EMBODIMENTS

Illustrated schematically is a system of the general type which might be employed in a large, high volume bakery, such as the types which have been established for the provision of buns or the like to fast-food franchise outlets in a sizable metropolitan area. The initial piece of equipment is a dough mixer 11 wherein flour, water, yeast and other ingredients are combined and treated to form a dough of desired consistency and uniformity. From the mixer 11, the dough is formed into the desired shapes, e.g., hamburger buns, and the formed dough pieces are disposed in individual baking pans, which operation can be automatically effected in an apparatus 13 referred to as a panner. Pans containing the raw dough shapes proceed to a heated enclosure referred to as a proofer 15 where the dough pieces will be held at a temperature of about 90° F. to 100° F. for a sufficient time for the yeast action to cause the dough to rise. For example, a time of from about 30 to 45 minutes at about 90° F. is often used.

The pans of the risen dough pieces next enter an oven 17 where they are baked at a time and temperature sufficient to produce the desired bread product. Normally baking will take place above about 300° F., and for example, baking of hamburger buns at 7 to 8 minutes at about 375° F. may be used.

Following baking, the baked groups of rolls in each pan are separated from the pans in a device referred to as a de-panner 19 and are deposited upon a suitable conveyor, preferably having a stainless steel belt, where they proceed to an area of the plant where they are air-cooled from the temperature at which they leave the oven, e.g., about 300°, to a temperature of the range of between about 120° F. and about 85° F. Generally, this air-cooling will be accomplished during a time period of about 10 to 15 minutes and will depend upon the ambient temperature in the plant during that particular day and will accordingly vary depending upon the time of year. Preferably, it will be possible to reduce the temperature of the baked bread goods to an average temperature of not more than about 120° F., realizing that when its exterior is at a temperature of about 100° F., the interior core of the bun will be at a higher temperature, for example, about 130° F. For purposes of this application, the term average temperature is meant to denote the temperature of the overall mass of the item which would be measured by removing a bun from the conveyor and placing it within a calorimeter for steady-state measurement.

The efficiencies of operation in a large, high volume bakery of this general type are achieved through continuously carrying on the process, and accordingly it is contemplated that the goods will be in substantially continuous motion on conveying apparatus at least from the time that the pans of risen dough pieces enter the oven and thereafter throughout the remaining operations until they are sliced and bagged. Accordingly, the groups of freshly baked, air-cooled buns are delivered by the conveyor 21 to a cryogenic cooler 23 wherein the average temperature will be rapidly dropped to between about 37° and about 45° F. in a time of between about 5 and 15 minutes. Preferably, the average temperature of the baked bread goods is dropped to a temperature of about 40° F. in a time of about 10 minutes.

Although any suitable cryogenic cooler may be used, preferably a large cabinet-type freezer including a helical or spiral conveyor is employed which utilizes liquid carbon dioxide as the cryogen that is expanded within the cabinet to create $CO_2$ snow and cold $CO_2$ vapor, such as that illustrated in copending patent application Ser. No. 229,923, filed Jan. 30, 1981 and assigned to the assignee of the present application. By maintaining such a cryogenic cooler at a temperature between about −40° F. and about −100° F. while the baked goods are being conveyed at a velocity of at least about 20 feet per minute, preferably, at a speed of about 40 ft. per min., a belt is used with a belt length of about 400 feet. At the end of about 10 minutes, the exterior surface region of the baked bread goods will have been lowered to slightly below about 40° F.; however, the interior core region of the baked goods will remain at a higher temperature.

It has been found that as a result of this cryogenic lowering of the temperature of the baked bread goods, the starch crystallization process will have begun, and by thereafter maintaining the goods at an average temperature of between about 37° F. and about 45° F. and preferably at about 40° F. for a time of between about 30 and 60 minutes, at the conclusion of this period of time, starch crystallization has reached the desired level. The baked goods may then be frozen and upon thawing or unfreezing will exhibit the desired qualities of texture and softness for immediate consumption. As a result, the 40° F. buns are ready for slicing and bagging and thereafter freezing. It should be realized, however, that the time is cumulative, and some crystallization will begin significantly when the temperature falls below about 50° F. and continue until the freezing process drops the temperature to about the freezing point of water. Accordingly, to achieve the desired degree of starch crystallization, the cumulative time within this overall temperature range should be at least about 45 minutes and preferably at least about one hour.

As earlier indicated, when the baked bread goods exit from the cryogenic cooler, the inner core may remain at a higher temperature than 40° F. The heat-transfer characteristics of bread goods are such that it will take a fair amount of time for the heat from the center core to flow outward to the outermost region, and during this period of time, the heat which reaches the outermost region must be removed from the outer surface as this equilibration process continues. Preferably, this heat transfer from the baked goods takes place while the goods continue to move along a conveyor in a thermally insulated chamber 25 which is maintained at a temperature between about 37° and about 45° F. The length of the thermally insulated conveyor 25 is such that the goods will be within it for at least 25 minutes and preferably for at least about 45 minutes. The continuous movement of the groups of rolls facilitates the removal of heat to the atmosphere within the insulated compartment while also contributing to the overall efficiency of the substantially automated system for the baking, slicing, bagging and freezing of rolls or the like.

When cryogenic cooling is used to quickly drop the average temperature of the baked goods to about the 40° F. range, the exhaust cold vapor from the cryogenic cooler is available and should be more than adequate to provide the cooling necessary in the thermally insulated conveyor compartment 25 to compensate for the heat leaking inward from the ambient atmosphere through the insulation and the residual heat which is being dissipated from the interior cores of the individual baked bread goods. Accordingly, an exhaust line 27 conducts the cold vapor from the cryogenic cooler into the entrance end of the thermally insulated conveyor 25. A tee 29 in the line leads to a flow-regulating valve 31 which in turn connects to a vent line 33 leading exterior of the plant. A similar vent line 35 is connected near the exit of the conveyor compartment which includes a flow-regulating valve 37. A temperature sensor 39 is located within the compartment to constantly monitor the temperature. The temperature sensor 39 is electrically or otherwise suitably connected to the control devices for the flow regulating valves 31 and 37 so as to adjust the balance of cold cryogen vapor being vented, respectively, through the lines 33 and 35. Accordingly, if the temperature begins to climb above the desired temperature within the conveyor compartment, e.g., about 40° F., less vapor will be vented through the line 33 so that a larger portion of the cold vapor will flow through the conveyor and out the vent 35, thus bringing the temperature back down to the desired range.

Although an exterior source or refrigeration, such as a mechanical refrigeration system using coils wherein a chlorinated fluorocarbon is evaporated, could be used for cooling the thermally insulated conveyor 25, the availability of the source of cold inert cryogen vapor from the cryogenic cooler 23 provides not only an inexpensive source of cooling, but one which is substantially trouble-free and has the advantage of providing an inert atmosphere. In addition, the use of the cryogenic cooler quickly freezes the surface of the baked goods and thus seals in the moisture, which has been found not only to aid in the ultimate starch crystallization which takes place, but to preserve the texture of the bread goods providing an ultimate product having the desired moisture and clearly devoid of dryness, such as might be encountered in bread goods if noncryogenic freezing were employed.

The groups of baked rolls or the like exit from the thermally insulated conveyor and preferably immediately enter an automatic slicing apparatus 41 where the individual rolls are suitably sliced to prepare them for their ultimate use. The slicer 41 is, of course, a standard piece of equipment available on the market and in use at the present time. The sliced bread goods enter a bagger 43 wherein they are packaged within a moisture-barrier bag or wrapper in which they will be delivered to the point of ultimate end use. At this point, the buns are tested by toasting and applying relish and a freshly cooked hamburger patty; they are found to have achieved the desired amount of starch crystallization and to create a tasty and attractive sandwich.

The bagged bread goods are then frozen in a freezer 45 by lowering their temperature usually to between about 10° F. and about −10° F. The starch crystallization has been completed by the time the baked bread goods enter the freezer 45, and thus the time-temperature conditions of the freezing process are not deemed to be critical. Generally, sliced bread goods will be frozen at a temperature of about 0° F., and the freezer 45 may be a cryogenic freezer or may be a mechanical refrigeration unit. Likewise, inasmuch as this is the last step in the overall process, the freezing need not be carried out on a continuous motion basis but can be done as a part of a batch or other freezing process.

It is contemplated that the sliced, bagged, frozen bread goods will be transported in frozen conditions by suitable delivery trucks 47 or the like to an outlying destination which will normally be the point of ultimate use, i.e., a franchised fast-food outlet. Upon arrival, they will be placed in frozen storage 49 where they will be held usually along with the meat patties or the like that are to be ultimately served on the buns. It has become common to cook the meat patties in such fast-food outlets directly from a frozen condition, and the patties are thus shown entering a cooker 51 which may be of the type that transports them from one end to the other wherein they enter in frozen condition and exit in a fully cooked condition. As a result of the present invention, the frozen, sliced buns can be placed in frozen condition on a parallel unfreezer-toaster 53 wherein they will be thawed or defrosted and thereafter toasted during the same time interval when the meat patty or the like is being cooked. As a result, the meat patty and the bun are then mated, relish and/or garnish are applied, and the cooked sandwich is ready for sale to the ultimate customer. Even when exposed to the moisture and fat from the relish and freshly cooked meat patty, the bun retains its shape and consistency and creates a tasty and attractive sandwich.

The invention allows a large, high volume bakery to produce, bake and continuously freeze a bread dough product to produce a frozen product that has undergone the desired amount of starch crystallization so that, upon unfreezing or thawing, it is ready for immediate consumption. The invention as a result provides substantial economies and efficiencies of operation by being able to dispense with the necessity for meeting precise daily baking schedules and for having a fleet of trucks for daily delivery of freshly baked goods to the fast-food outlets which must then use the goods within a very specific amount of time or discard them to garbage because they could no longer be assured of meeting the standards. The ability to efficiently provide frozen baked bread goods which can be distributed on a relaxed schedule and then stored substantially until the time they are needed for consumption provides great flexibility and minimization of waste. Although it would be posssible to remove a number of group or sheets of buns from frozen food storage each night to allow them to unfreeze in ambient air conditions for the following day's use, it is preferable to unfreeze and toast the bun in a single operation because it assures consistent quality and removes the need for the interjection of a human step as well as prediction of the amount of baked goods that will be consumed the following day.

Although the invention has been illustrated and described in respect to the preferred embodiment which constitutes the best mode presently contemplated by the inventors, it should be understood that various changes and modifications as would be obvious to one having the ordinary skill in the art may be made without departing from the scope of the invention which is defined by the claims appended hereto.

Various features of the invention are emphasized in the claims which follow.

What is claimed is:

1. A method of preserving freshly baked goods comprising
   baking bread dough goods in an oven at a temperature above about 300° F.,
   shortly thereafter, both lowering the temperature of said baked goods from the temperature at which they leave the oven to at least about 120° F. and then cryogenically cooling said baked goods so as to drop the temperature thereof to a temperature of about 37° F. to about 45° F. in about 5 to about 15 minutes,
   thereafter maintaining said cryogenically cooled baked goods at a temperature of about 37° F. to about 45° F. for at least about 25 minutes to effect a desired rapid degree of starch crystallization in said baked goods sufficient to fully convert the baked dough to marketable bread goods and, when this desired degree of crystallization is reached,
   thereafter freezing said baked goods.

2. A method in accordance with claim 1 wherein said cryogenic cooling is effected while said baked goods are being continuously conveyed through a defined insulated region, which region is cooled by the expansion of liquid $CO_2$ to substantially atmospheric pressure.

3. A method in accordance with claim 2 wherein said defined region is maintained at a temperature of at least about $-40°$ F.

4. A method in accordance with claim 2 wherein said baked goods are conveyed at a velocity of at least about 20 ft. per minute through said cryogenic cooling step.

5. A method in accordance with claim 2 wherein said cryogenically cooled baked goods are maintained at about 40° F. for between about 25 and about 60 minutes prior to said freezing.

6. A method in accordance with claim 5 wherein said maintenance is effected by continuously moving said baked goods through a refrigerated enclosure.

7. A method in accordance with claim 6 wherein said cryogenic cooling is effected by the expansion of liquid $CO_2$ to form $CO_2$ snow and $CO_2$ vapor and wherein $CO_2$ vapor from said cryogenic cooling step is caused to flow through said insulated enclosure to maintain its temperature in the range of about 45° F. to about 37° F.

8. A method in accordance with claim 1 wherein said baked goods are cooled to a temperature between about 10° F. and about $-10°$ F. during said freezing step.

9. A method in accordance with claim 1 wherein said baked goods are sliced and wrapped in a moisture barrier wrapper after leaving said enclosure and prior to said freezing step.

* * * * *